United States Patent [19]

Frey et al.

[11] 4,320,423
[45] Mar. 16, 1982

[54] APPARATUS FOR AUTOMATIC REPEATED REPRODUCTION OF SOUND ON SELECTED PORTIONS OF MAGNETIC TAPE OR THE LIKE

[75] Inventors: Ernst Frey, Unterägeri; Alois Aregger, Zürich, both of Switzerland

[73] Assignee: Nähma AG, Unterägeri, Switzerland

[21] Appl. No.: 953,756

[22] Filed: Oct. 23, 1978

Related U.S. Application Data

[63] Continuation-in-part of Ser. No. 780,071, Mar. 22, 1977, abandoned.

[30] Foreign Application Priority Data

Mar. 22, 1976 [CH] Switzerland ............................ 3357/76
Mar. 16, 1977 [DE] Fed. Rep. of Germany ....... 2711463

[51] Int. Cl.³ ...................... G11B 15/18; G11B 19/06; G11B 17/00
[52] U.S. Cl. .................................. 360/72.2; 360/74.2; 360/74.6
[58] Field of Search ................... 226/33; 242/197, 199; 35/35 C; 360/69, 72, 71, 74, 83, 90, 93, 72.2, 72.1, 72.3, 74.1, 74.3–74.4, 74.6

[56] References Cited

U.S. PATENT DOCUMENTS

| | | | |
|---|---|---|---|
| 3,541,271 | 11/1970 | Joslow et al. | 360/71 |
| 3,571,524 | 3/1971 | Kozo et al. | 360/72 |
| 3,573,360 | 4/1971 | Rose | 360/73 |
| 3,681,523 | 8/1972 | Sidline | 360/72 |
| 3,727,203 | 4/1971 | Crossman | 360/72.2 |
| 3,812,532 | 5/1974 | Crosser et al. | 360/72 |
| 3,913,133 | 10/1975 | Aregger | 360/72 |
| 3,921,215 | 11/1975 | Asami | 360/137 |
| 3,949,420 | 4/1976 | Older | 360/72 |
| 4,066,349 | 1/1978 | Flint | 360/72 |
| 4,120,006 | 10/1978 | Nagami et al. | 360/72 |

FOREIGN PATENT DOCUMENTS

| | | |
|---|---|---|
| 2425856 | 12/1975 | Fed. Rep. of Germany . |
| 520384 | 4/1972 | Switzerland . |
| 743448 | 1/1956 | United Kingdom . |
| 912462 | 12/1962 | United Kingdom . |
| 931809 | 7/1963 | United Kingdom . |
| 969640 | 9/1964 | United Kingdom . |
| 1195775 | 6/1970 | United Kingdom . |
| 1313226 | 4/1973 | United Kingdom . |

*Primary Examiner*—Alfred H. Eddleman
*Attorney, Agent, or Firm*—Kontler & Grimes

[57] ABSTRACT

The movement of the tape is monitored. When the operator recognises during playback of the tape the start position of a tape sequence to be repeated he actuates a start switch upon actuation of which a value corresponding to the monitored tape movement is loaded into a storage or the monitored tape position is assigned to a fixed value. The value is then in any case a read-only value statically stored or assigned. When the operator recognises the end position of the tape sequence he actuates an end switch upon actuation of which a value corresponding to the monitored tape position is loaded into a storage. This value too is then a read-only value statically stored. The two values stored are now compared with the monitored tape movement. Control signals are generated when the stored values match the tape position.

20 Claims, 13 Drawing Figures

APPARATUS FOR AUTOMATIC REPEATED REPRODUCTION OF SOUND ON SELECTED PORTIONS OF MAGNETIC TAPE OR THE LIKE

CROSS-REFERENCE TO RELATED APPLICATION

This is a continuation-in-part of our copending application Ser. No. 780,071 filed Mar. 22, 1977 for "Apparatus for automatic repeated reproduction of sound on selected portions of magnetic tape or the like", now abandoned.

BACKGROUND OF THE INVENTION

The present invention relates to improvements in apparatus for reproduction of sound or other intelligence on selected portions of one or more magnetic tapes, wires or analogue carriers of information. More particularly, the invention relates to improvements in systems which can effect one or more reproductions of intelligence which is stored on selected segments or portions of disc-, web- or wire-like carriers (hereinafter referred to as magnetic tapes for short). Still more particularly, the invention relates to improvements in apparatus for reproduction of sound or other intelligence on selected portions of one or more magnetic tapes, as concerns the accuracy of the repetition cycle, i.e., the probability that the start and the end point of a carrier portion bearing intelligence to be reproduced several times will be located exactly over and over again independently of the number of repetitions.

It is already known to provide apparatus or attachments which can be combined with or incorporated in magnetic tape recorders and serve to allow for repeated reproduction of sound which is stored on magnetic tape. Certain presently known apparatus are not sufficiently sophisticated to allow for reproduction of sound on selected portions of magnetic tape, i.e., the sound which is recorded on the tape must be reproduced in its entirety. This is the case when the tape consists of an endless tape-loop. The length of the magnetic tape is then limited, i.e., a first tape-loop must be replaced with a second tape-loop which is longer than the removed one if the amount of sound to be recorded is such that it cannot be stored on the first tape-loop. Still further, presently known apparatus which are designed to allow for repeated reproduction of entire intelligence which is recorded on magnetic tape are not suited for a variety of purposes, for example, when a student desires to select the overall amount of intelligence which is to be stored on a tape as well as those portions of intelligence which are to be reproduced once or more than once.

U.S. Pat. No. 3,913,133 granted Oct. 14, 1975 to Aregger (corresponding to Swiss Pat. No. 549,256) discloses a method and apparatus which allow for repeated reproduction of sound on selected portions of magnetic tape. The patented apparatus employs two dynamically operated mechanical counters which respectively register the distances covered by the magnetic tape in first and second directions. When the registered distance in one direction has reached a preselected absolute value, detected by one counter, the movement of the tape is reversed and the second counter starts registering the distance covered by the carrier in the opposite direction, until the second counter registers again a preselected value according to the length of the sequence to be repeated. The direction of movement of the carrier is thereupon reversed and the first counter starts registering the distance in forward direction.

Thus, two dynamically operated mechanical counters for measurement of the length of the carrier portion during a repetition cycle interact with each other to define the reption cycle. The use of these two counters which are operatively coupled to each other may adversely affect the accuracy of locating the end points of the repetitions cycle, especially when repeated several times.

British Pat. No. 912,462 granted to AKAI describes a method and apparatus which also allow for repeated reproduction of sound or intelligence. A dial is operatively coupled to the tape for movement during repetition. The dial performs a rotational movement as a result of conversion of the linear tape movement into a rotational movement. A rotably mounted knob on the dial is not coupled to the tape, i.e., it must be rotated by operator. A slip ring is mounted on and is in sliding contact with the dial so that it can be rotated relative to the dial by an operator and is additionally frictionally driven by the dial according to the tape movement. The dial carries a first contact cooperating with a second contact on the knob, and a third contact which is rigidly mounted on the frame of the apparatus cooperates with a projection on the slip ring. Engagement of first and second contacts defines one end of the repetition cycle, and engagement of the projection with the third contact defines the other end of the cycle. Basically the position of the tape is compared with a preselected position by interaction of dial contact and knob contact for a first end position. One dynamically operated means (dial contact) interacts with a settable stationary means (knob contact) the setting of which is analogous to the setting of a storing means to a fixed value which is to be compared with a dynamic value given by the position of dial contact varying in time with the tape movement. Setting of the slip ring on the dial the latter being dynamically operated and is analogous to establishment of a phase difference between two dynamical values. Dial contact and slip ring projection are both dynamically operated as a function of the tape movement. The fact that, for definition of the two end points of the repetition cycle, the slip ring has to be set on the movable dial entails serious disadvantages as concerns the construction as well as the accuracy of repeatedly locating the desired end points of the cycle to be repeated. As an example, interaction of projection on the slip ring with the rigidly mounted third contact may result in movement of the ring with respect to the dial and thus alter the length of the preselected cycle. This is likely to occur after the reset of the slip ring on the dial has been worn out by use.

A drawback of the just described apparatus is that it is incapable of insuring repeated reproduction of sound on one and the same segment of magnetic tape. This is due to the fact that the known apparatus employ a larger number of dynamically operated parts than absolutely necessary to locate the two end points of the repetition cycle. Other related prior art which was considered by and/or is known to applicants includes U.S. Pat. Nos. 3,571,524, 3,681,523, 3,921,215, 3,812,532, 3,949,420, 3,913,133, British Pat. Nos. 1,313,226, 1,195,775, 969,640, 931,809, 743,448, 912,462, German laid open print No. 2 425 856 and Swiss Pat. No. 520 384.

OBJECTS AND SUMMARY OF THE INVENTION

An object of the invention is to provide a method of controlling the operation of a machine which insures repeated reproduction of information on a selected portion of magnetic tape or the like with a degree of accuracy which, even after long periods of use, greatly exceeds the accuracy of heretofore known machines, and to provide an apparatus for effecting such control of the machine, this object being achieved by a general system improvement which may be realized mechanically or electronically, or by resorting to a hybrid technique.

Another object of the invention is to provide an apparatus as outlined above for use with a tape recorder of any commercially available type.

A further object of the invention is to provide the apparatus with novel and improved mechanical or electronic means for memorizing the loci of selected portions of magnetic tape to thus insure that renewed reproduction of corresponding intelligence is invariably started and terminated in such a way that the recorder reproduces identical intelligence, either once or more than once.

An additional object of the invention is to provide a mechanically or electronically controlled attachment which is relatively simple and inexpensive and which can be readily manipulated by skilled or unskilled persons, and which (if desired) can be combined with two or more tape recorders or the like.

One feature of the invention resides in the provision of an apparatus for effecting automatic reproduction of intelligence on a selected portion of tape in a machine wherein intelligence is recorded on magnetic tape and which includes rotary means for paying out and collecting the tape, means for driving the rotary means in either direction and means for operating the driving means. The apparatus comprises (A) means for establishing and storing a pair of physical values as readonly values, (B) detector means for monitoring the positions of the tape, (C) comparator means, coupled to the storing means as well as to the detector means, and having output means arranged to furnish control signals for the machine when the detected tape positions correspond to the stored values, and (D) control means connected to the output means of the comparator means on the one hand and connectable to the means for operating the driving means on the other hand.

The physical values to be stored in the storing means can be mechanical or electrical values. If they are mechanical values, e.g., denoting the distances covered by the tape, the storing means comprise movable mechanical parts which are moved to an extent corresponding to the length of the tape portion to be repeated and which parts, afterwards, remain stationary thus providing read-only values to define the foremost and rearmost ends of the selected portion of magnetic tape. In a special case, the first storing means may remain stationary whereas, when actuated, the second storing means may be mechanically moved away from the first storing means to a predetermined position, the positions of the two storing means with respect to each other being representative of the foremost and rearmost ends of the selected portion of magnetic tape. When acting mechanically, the output of the detector means comprises a mechanical part performing a movement in imitation of the tape movement, such mechanical part thus dynamically moving between the spaced apart mechanical storing means. The mechanical comparator means constitutes a means which is activated when the dynamically moved detector means reaches either of the storing means, the position of the latter remaining unchanged during repetition of a tape sequence as often as desired, thus memorizing the foremost and rearmost ends of the selected portion of magnetic tape as read-only values.

When realized with electronic components, the storing means comprise at least one digital store-register, the second value being preferably set to electrical zero the storing of which value does not require a storing register. The converter means then may comprise an opto-electric converter which converts the movements of the tape by way of opto-electric means into electrical signals, e.g., a pulse rate, this pulse rate being transmitted to a digital counter. The comparator means then comprises logic gates or analogous logic circuits connected between the output of the counter and the output means of the storing means, the logic gates transmitting a first control signal as soon as the output signal of the counter equals the first stored value and a second control signal as soon as the output signal of the counter equals the second stored value, the control signals being transmitted to the means for operating the driving means of the machine so as to automatically change the direction of movement of the tape as required for continuous repetition of the selected portion.

The novel features, namely, generally providing a dynamical value which is representative of the tape movement and controlling the tape movement for sequence repetition by a comparison of this dynamical value with two preset fixed values insure a high accuracy of repeatedly locating the rearmost and the foremost ends of the selected portion, even after completion of many repetition cycles.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

The apparatus of the present invention may be associated with or incorporated into a commercially available tape recorder, e.g., a recorder which utilizes cassettes containing a record carrier in the form of magnetic tape. The details of the tape recorder are shown and described only to the extent which is necessary for full understanding of the invention. The improved apparatus serves for repeated reproduction of intelligence (sound) which is stored on selected portions or segments of the tape. It is immaterial whether the tape is stored in a cassette or on rotary supply and takeup reels which are not confined in a cassette.

Figure 1:
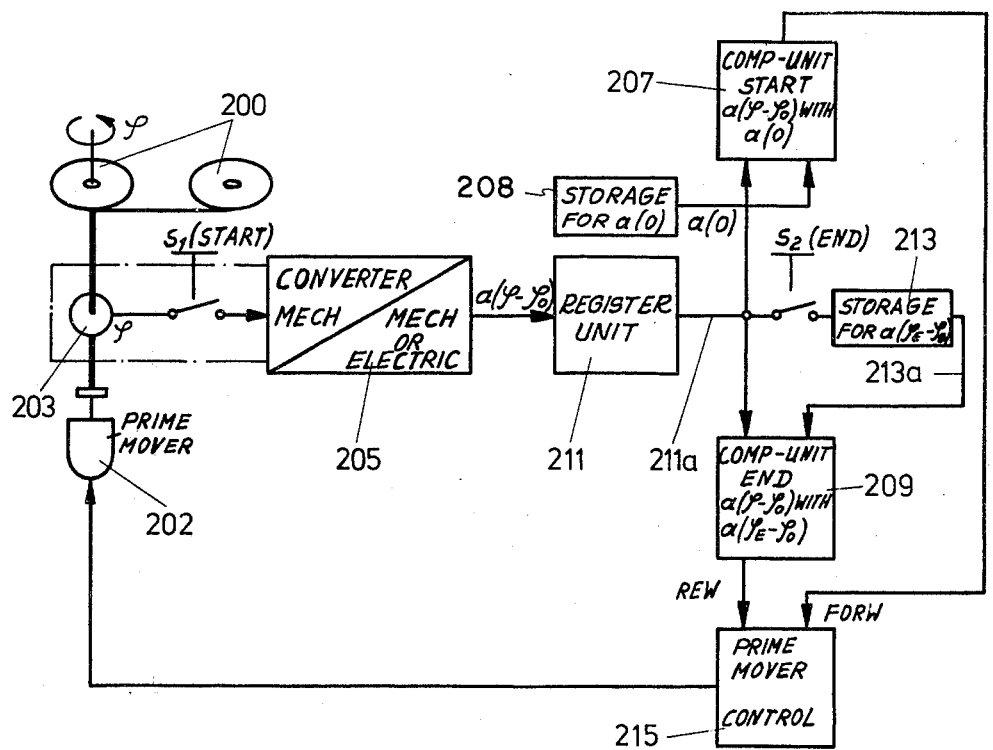
FIG. 1 is a block diagram of one form of the invention.

According to FIG. 1, the tape reels 200 are driven by a schematically shown shaft 201 transmitting torque from a prime mover 202 to the tape reels to move the tape, as is known, for play, record, fast forward or fast backward operation. The movement of the shaft 201 including the usual capstan drive which is derived from the same prime movel is converted by means of a converter unit 205, which may comprise a gear box 203 (shown by broken lines), into an electrical or mechanical value. Certain types of converters which can be used for mechanical/mechanical or mechanical/electrical conversion will be described below. When actuated, an operator-actuated start switch $S_1$ for setting the first end point of a sequence to be repeated when reproducing intelligence recorded on the magnetic tape establishes a mechanical or electrical connection between the shaft 201 and converter 205 the output of which is connected to a register unit 211 which then starts to register the value $a(\phi-\phi_o)$, e.g., a value representing the tape movement performed after actuation of the start switch $S_1$. Here a denotes the conversion transfer function and $\phi$ denotes the angular displacement of the shaft 201, which assumes the value $\phi_o$ at the zero instant of setting the start switch $S_1$. The signal at the output of the register unit 211, which latter can be an electronic counter or an analogously moved mechanical part as will be described below, is transmitted to a first (start-point) comparator unit 207 and to a second (end-point) comparator unit 209. When the operator actuates the start switch $S_1$, the register unit 211 instantaneously registers zero value $(a(\phi-\phi_o)=0)$ which value rises as a function of the extent of further movement of the tape. Thus, the starting point for the repetition cycle will always be defined as zero which value a $(\phi)$ is transmitted to a second input of the comparator unit 207. This zero value will be stored electronically, as described below, by connecting one input of an electronic comparator unit to zero or mechanically by defining the position of a mechanical stop as this zero position. The signal at the output of the register unit 211 is transmitted via an operator-actuated stop switch $S_2$ to a storage 213 so that, when the switch $S_2$ is actuated, the storage 213 stores a value $a(\phi_E-\phi_o)$ representing the tape movement $\phi_E-\phi_o$ which was completed during the interval between actuation of the start switch $S_1$ and stop switch $S_2$.

As the signals at the output of the register unit 211 as well as at the output 213a of the storage 213 are transmitted to the end point comparator unit 209, this comparator unit will detect the same values at either inputs when the stop switch $S_2$ is actuated and will thus provide a control signal "r e w" switching via control unit 215 the prime mover 202 of the tape recorder into rewind operation. As soon as the register unit 211 registers that the converted movement $a(\phi-\phi_o)$ of the tape reaches zero, the start comparator unit 207 will provide a control signal "f o r w" switching via unit 215 the prime mover 202 into play operation.

If in mechanical realization the storage for the start position of the sequence is formed by a fixed stop, the storage 213 constitutes, as will be described below, a mechanical part which is moved away from the fixed stop as soon as the start switch $S_1$ is actuated. Actuation of the stop switch $S_2$ stops the movement of the mechanical part which acts as storage 213. Mechanically, the register unit 211 is formed by a further part which is moved in imitation of movement of the tape forwards and backwards between the fixed stop according to the zero position storage and the mobile mechanical part corresponding to the end point storage 213. The start point comparator unit 207 is mechanically realized by a means which is activated when the dynamically moving part according to the register 211 contacts the fixed stop storing the start value, whereas the end point comparator unit 209 is formed by contact means activated when the dynamically moving part according to register 211 contacts the fixed part storing the end value.

It can be seen that one dynamical value or one dynamically driven part is moved between two fixed, pre-set values or parts. Reaching of either fixed value by the dynamic value provides a control signal for performing the repetition cycle. The fixed values act after having been set by the operator as read-only values.

Figure 2:
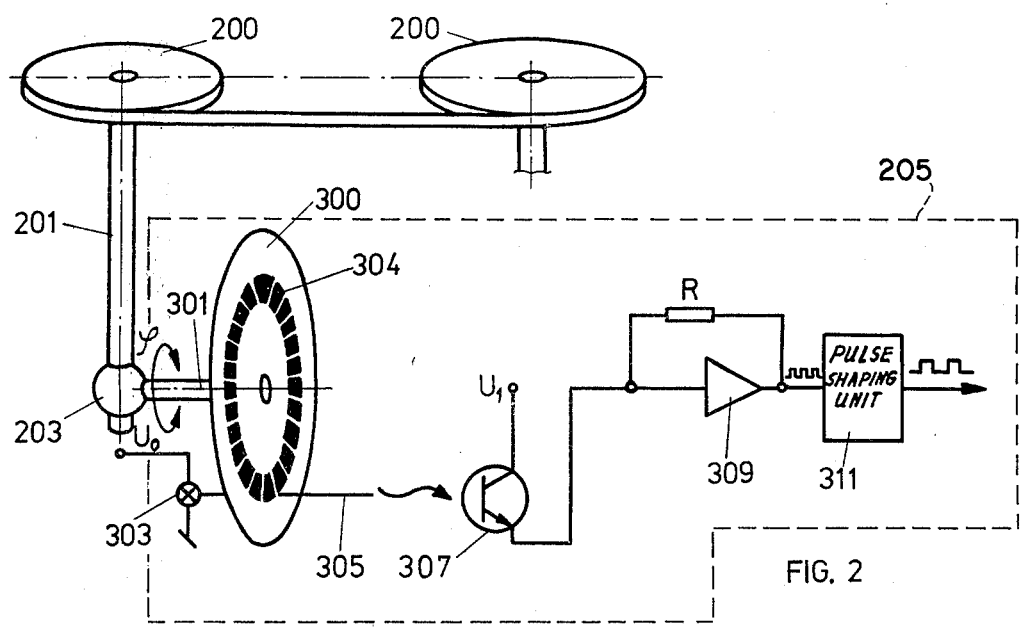
FIG. 2 shows an electro-optical converter for realizing the invention as shown in FIG. 1 with electronic components.

FIG. 2 shows a mechanical-electrical converter whereby the conversion is performed by opto-electrical means. A coding disc 300 driven by a shaft 301 is coupled via gear box 203 to the shaft 201 driving one of the tape reels 200. Additional details of the tape recorder which includes the reels 200 have been omitted in this figure which merely serves to show how the tape movement can be converted into electrical signals if the apparatus for controlling repetition is an electronic apparatus. The coding disc 300 comprises a ring with a large number of segments 304 each having a different light transmission ratio than the rest of the disc so that a light beam 305 which is emitted by a light source, (e.g., a LED-diode 303) will be interrupted and transmitted by the coding disc 300 so as to provide light pulses. The pulsed light beam 305 is caused to impinge upon a photoelectric converter here shown as a phototransistor 307, the current of which is amplified by an operational amplifier 309 to transmit a sequence of electrical pulses which are fed to a pulse shaping unit 311, e.g., to a Schmitt trigger. At the output of the pulse shaping unit 311, a train of electrical pulses appears each pulse of which represents an incremental movement of the coding disc 300 and thus of the tape.

By appropriate selection of the step-down ratio of the transmission in the gear box 203, as well as of the segments 304 on the coding disc 300, a very good resolution of the tape movement can be achieved.

Figure 3:
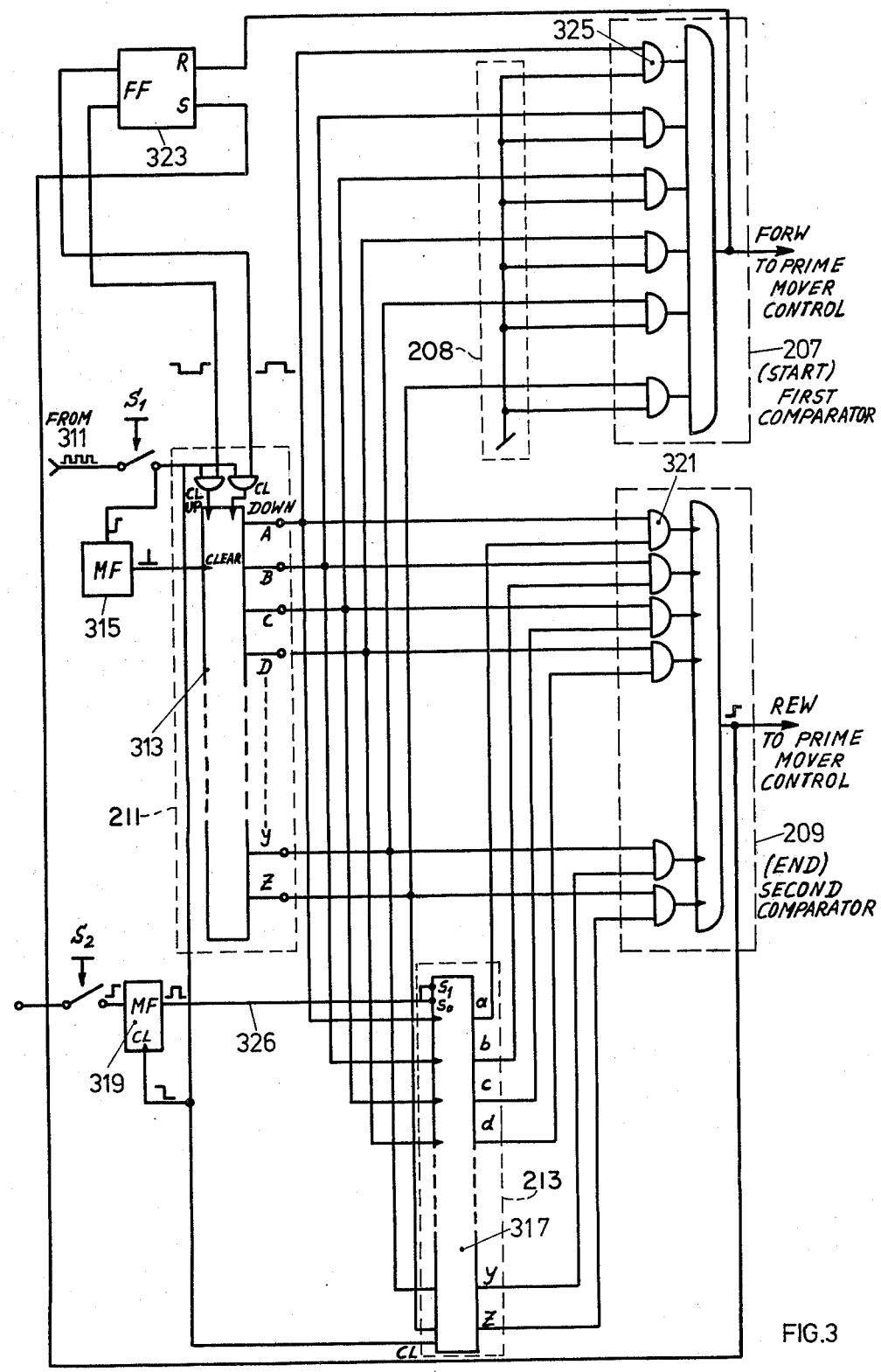
FIG. 3 shows an electronic realization of the invention as shown in FIG. 1.

According to FIG. 3, the electrical pulse train from the pulse shaping unit 311 is transmitted on actuation of start switch $S_1$, to a clock input of an electronic counter 313. This counter can be realized by cascading an appropriate number of synchronous up-down counters, e.g., type SN 74193 produced by Texas Instruments. As soon as the operator actuates the start switch $S_1$, the pulse train is transmitted to one of the clock inputs of the counter 313 which accordingly counts the incoming pulses upwards. By means of an edge triggered monostable multivibrator 315, mono-flop for short, emitting when the start switch $S_1$ is closed a clearing pulse to the "clear" input of the counter 313, the counter is reset before starting his upwards count. Binary signals which appear at the output-lines A to Z of the counter 313 are transmitted to a register 317 with parallel-in, parallel-out capability. This register can constitute a four-bit parallel access shift register SN-74195 produced by Texas Instruments. The register 317 will not be loaded with the output signals from the counter 313 until the operator actuates the stop switch $S_2$. Actuation of this switch triggers a bistable multivibrator 319, flip-flop for short, for the duration of one clock pulse from the pulse shaping unit 311, during which time the register 317 is loaded with the output data from the counter 313. Thus, the shift register 317 stores from now on until the stop switch $S_2$ is actuated again the endcount according to the end point of the tape sequence to be repeated. Now, the register 317 acts as read-only memory storing the end value as read-only value.

The output lines A–Z of the counter 313 are further connected to the second comparator unit 209, indicated by broken lines, which comprises a plurability of logic gates including several AND gates 321 one input of each of which is connected with a counter output line and another input of each which is connected with an output line of the register 317. If the signals at the output lines A–Z of the counter 313 match the signals at the output lines a–z, of the shift register 317, the comparator unit 209 will provide a "r e w" output signal which is transmitted to the prime mover control unit to reverse the direction of movement of the tape as well as to a control flip-flop 323 to reverse the count direction of the counter 313.

The second comparator unit 209 will provide an output signal for the first time as soon as the stop switch $S_2$ is actuated. Then the signal at the output of the counter 313 is fed into the register 317 the output signal of which thus equals the signal at the output of the counter 313. After activation of the stop switch $S_2$, a read-only or fixed value according to the end point of the tape sequence to be repeated is stored and remains stored in the register 317. The operation of the prime mover is reversed for rewinding the tape towards the start position of the sequence to be repeated; the counter 313 then counts down.

The signals at the output lines A–Z of the counter 313 are also transmitted to the first comparator unit 207 (indicated by broken lines) which comprises a plurality of logic gates including AND gates 325 one input of each of which is connected with a counter output line. The other input of each gate 325 is connected to a pre selected electrical potential, e.g., to electrical zero value.

As soon as the value of the signal at the output of the counter 313 reaches the stored zero value (while counting down), the first comparator unit 207 provides a "f o r w" signal for the prime mover control which then changes the operation of the tape recorder to playback operation. The sequence is then repeated for a first time. The output signal of the first comparator unit 207 switches the count direction of counter 313 again to upward count.

The values appearing at the output of the counter 313 are dynamical and vary in time with forward and backward movement of the tape, whereas the values stored in the shift register 317 on the one hand and at one input set of the second comparator unit 207 on the other hand are fixed values which, after having been set, are not influenced by the movement of the tape.

Actuation of start switch $S_1$ starts the counter 313 to count in upward direction. Thus, the output signals at lines A, B . . . X, Y, Z of the counter will be in time sequence:

| | |
|---|---|
| 0 0 ........ | 0 0 0 |
| 0 0 ........ | 0 0 1 |
| 0 0 ........ | 0 1 0 |
| 0 0 ........ | 0 1 1 | which denote the decimal counts $\phi$, 1, 2, 3, . . . . The $\phi$ value is assigned to the momentary tape position in the moment of activating start switch $S_1$. As one input set of the comparator unit 207 is also stationary set to $\phi$, $\phi$ . . . $\phi,\phi,\phi$ decimal $\phi$, this fixed value will match the decimal value $\phi$ at the counters output as soon as the tape reaches again that position at which start switch $S_1$ was actuated. Thus, the fixed decimal value $\phi$ at the input of the comparator unit 207 is a read only value which is assigned to the tape position reached in the moment of actuating start switch $S_1$, by the fact that the decimal $\phi$ value at the counter output is assigned to that tape position and that the counter output value is compared with the fixed decimal $\phi$ value at one comparator unit input set by this latter unit 207.

It is obvious that the fixed value at one input set of comparator unit 207 could also be set to an other decimal value, e.g., to 3 (binary $\phi,\phi$ . . . $\phi,1,1$); and that then this value would be assigned to the tape position reached at the moment of activating start switch $S_1$, if the counter was offset by a count of decimal 3 or that then this value would be assigned to that tape position reached three counts later then when the start switch $S_1$ was actuated.

The connection of one input set of the comparator unit 207 to fixed electrical potentials, e.g., to ground can be generally mentioned as generating means for a fixed physical value.

The control of the tape recorder by way of the outputs of the two comparator units can be carried out in well-known way, e.g., by using relays or, as will be shown later, with a set of solenoids.

Figure 4:
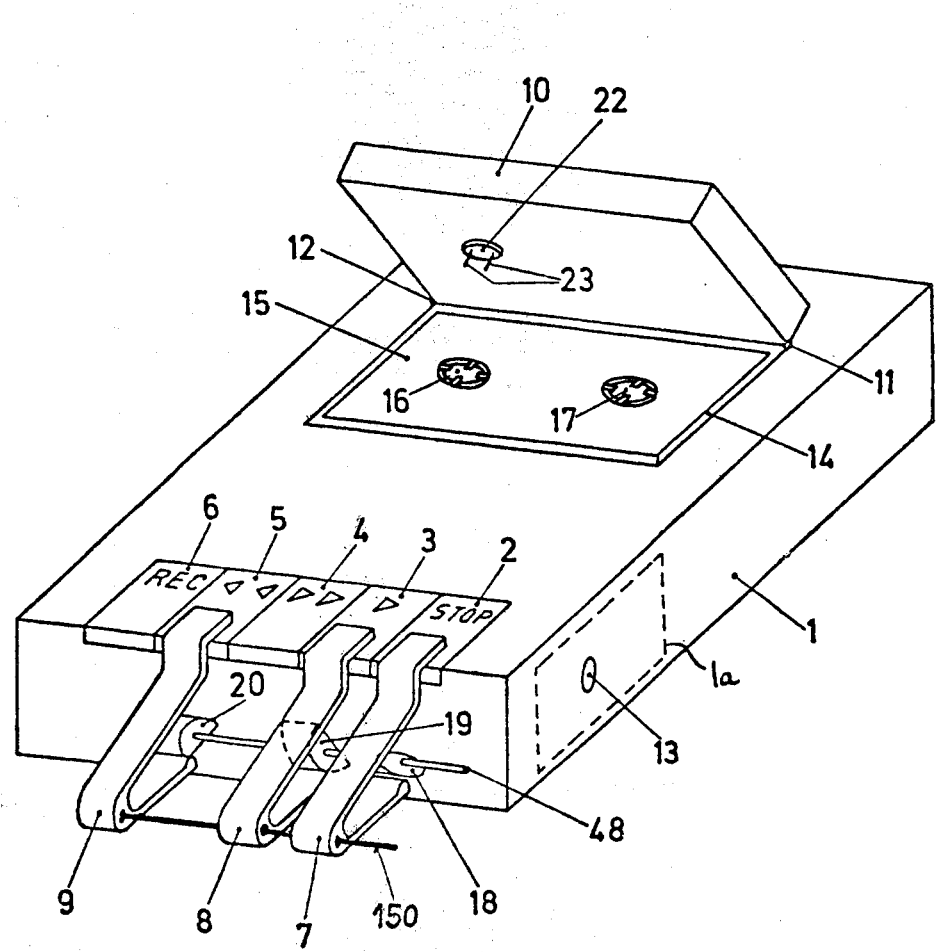
FIG. 4 is a perspective view of a machine with the improved apparatus mounted thereon.

FIGS. 5–8 show a meachnical version of the apparatus which is shown schematically in FIG. 1, and FIG. 4 shows a preferred combination of the apparatus with a tape recorder.

Figure 8:
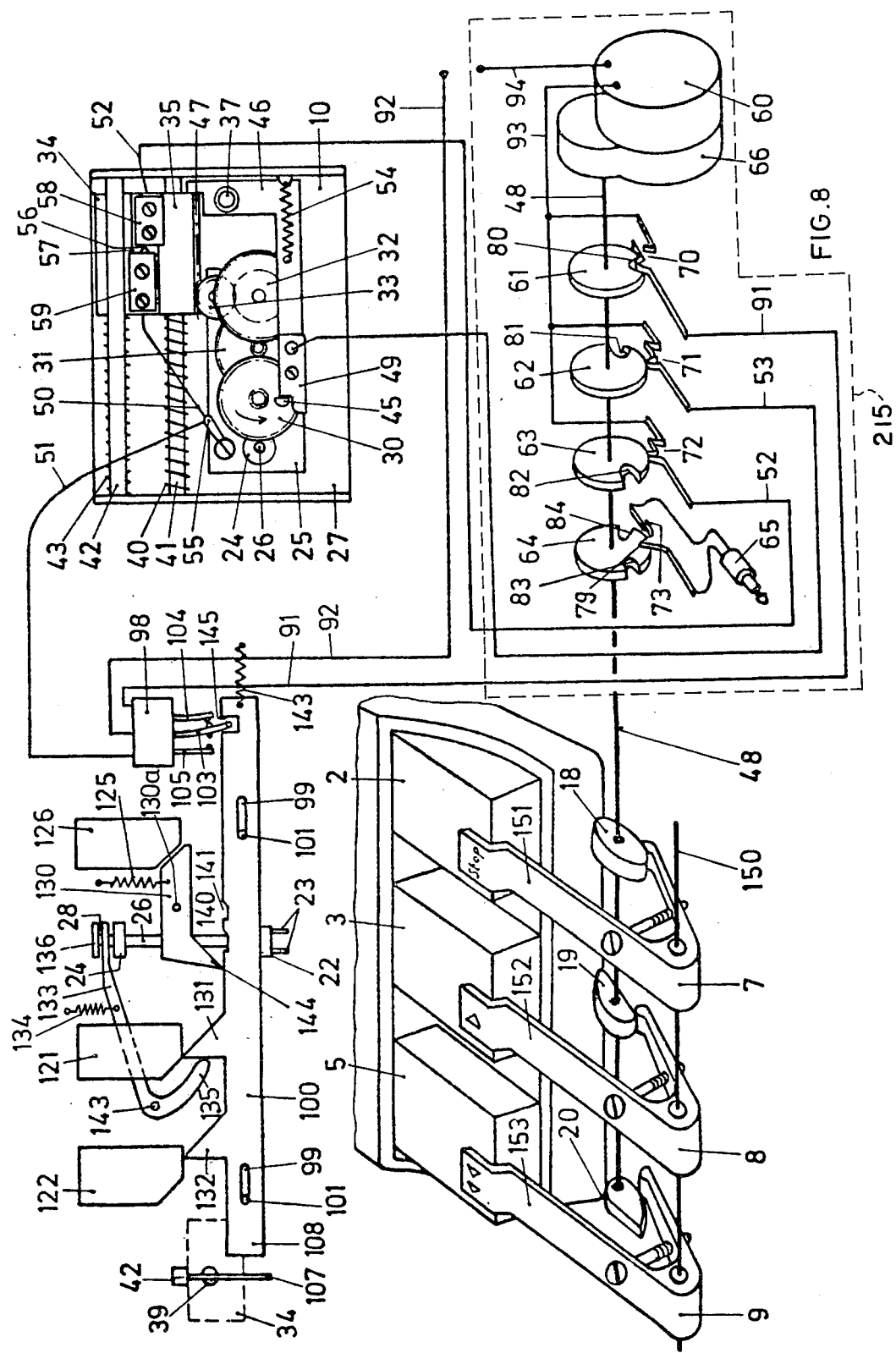
FIG. 8 is a partly developed and partly perspective view of the apparatus and its connections to the machine.
Figure 9:
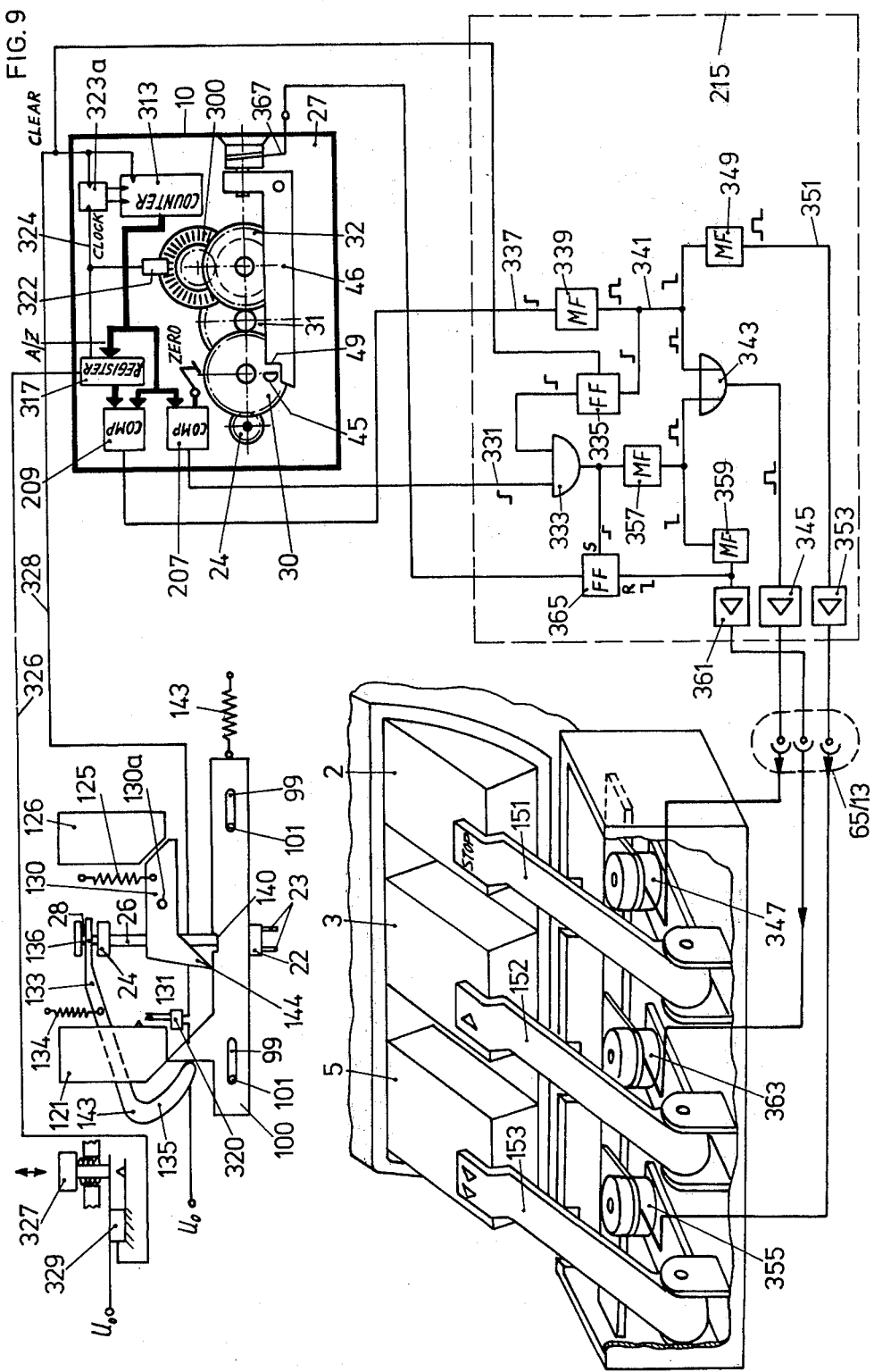
FIG. 9 is a partly developed and partly perspective view of an electronic apparatus and its connections to the machine.

The tape recorder 1 of FIG. 4 comprises a housing which supports operating means having actuating elements including a stop button 2, a playback button 3, a forward transport button 4, a rapid rewind button 5, and a recording button 6. The housing of the tape recorder 1 is further formed with a socket 13 for a plug 65 which is shown in FIGS. 8 and 9. The plug 65 forms part of means for starting or arresting the prime mover 1a of the tape recorder, i.e., the motor or motors which drive the tape lengthwise, either forwardly or backwards.

The top wall of the housing of the tape recorder 1 has a recess or chamber 14 for a cassette 15. The reels in the cassette 15 can receive torque from a first rotary element or spindle 16 which can be driven in a direction to draw the tape off the supply reel and/or from a second rotary element or spindle 17 which can be driven in a direction to wind the tape onto the supply reel. The casing of the cassette 15 has two star-shaped holes for the spindles 16 and 17 as is well-known.

In the embodiment of FIGS. 4 to 8, the attachment 10 constitutes a cover for the chamber 14 and is pivotally secured to the top wall of the housing of the tape recorder 1 by hinges including two pintles 11 and 12. An axially movable holder 22 for two coupling pins 23 is located at the underside of the attachment 10 in such position that the pins 23 register with the hole for the spindle 16 when the attachment is moved to the operative position in which it overlies the chamber 14 and the cassette 15.

The buttons 2, 3 and 5 can be depressed by V-shaped actuating elements 7, 8 and 9 which constitute two-armed levers and are pivotable on a horizontal supporting shaft 150. The levers 7, 8 and 9 can be respectively pivoted by cams 18, 19 and 20 which are mounted on a camshaft 48 extending in parallelism with the shaft 150. The cams 19 and 20 have a semicircular shape and are angularly offset with respect to each other by 180 degrees (FIG. 8). The cam 18 has two mirror symmetrical halves. The camshaft 48 can be rotated by a motor 60 which is shown in FIG. 8. When a lobe of the cam 18, 19 or 20 engages and pivots the lower arm of the respective lever 7, 8 or 9, the upper arm of such lever depresses the respective button 2, 3 or 5. The lever 7, 8 or 9 is pivoted clockwise, as viewed in FIG. 4, when a lobe of the associated cam 18, 19 or 20 engages its shorter arm to thereby displace its longer upper arm 151, 152 or 153 (see FIG. 8). The axis of the camshaft 48 coincides with the center of the cam 18.

Figure 5:
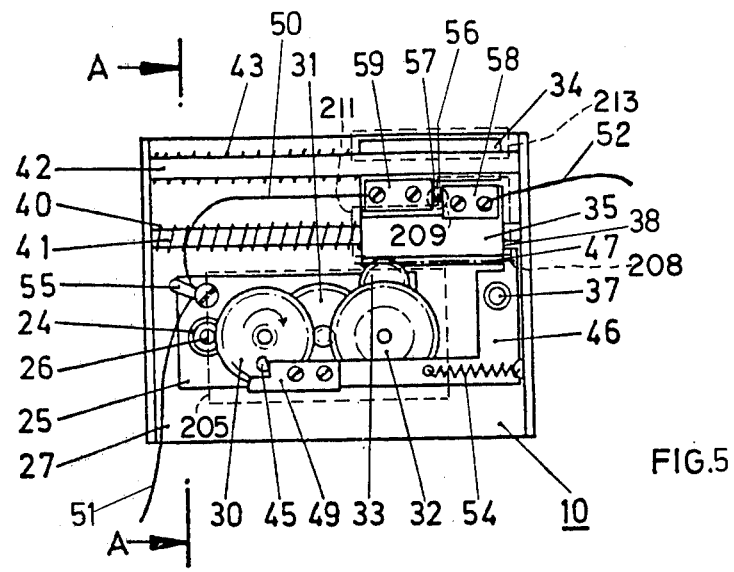
FIG. 5 is a plan view of an attachment according to FIG. 4 with its cover lifted and certain other parts omitted.
Figure 6:
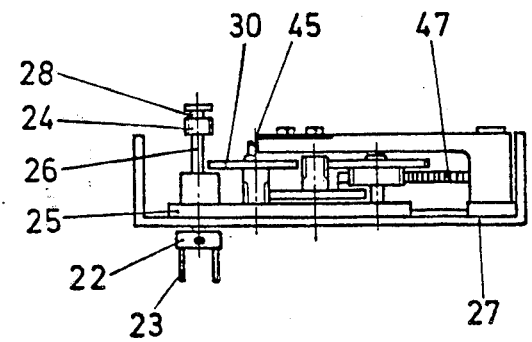
FIG. 6 is a side elevational view of the attachment shown in FIG. 5.

FIG. 5 is a plan view of the mechanical attachment 10 with the top wall or cover of its casing removed. Certain parts of the attachment 10, including a reciprocable slide or rail 100 (see FIG. 7) and knobs 121, 122, 126 (also shown in ) FIG. 7) have been omitted in FIG. 5 for the sake of clarity. Such parts are assumed to be located in front of the structure shown in FIG. 5 (see the line A—A which denotes the plane of FIG. 7).

Those parts of the attachment 10 which are shown in FIG. 5 are assumed to be held in inoperative positions. The attachment 10 comprises a base plate 25 which is rigid with a chassis or frame 27. A shaft 26 is rotatably and axially movably journalled in the base plate 25 and chassis 27 in such a way (see FIG. 6) that one of its end portions extends outwardly beyond the chassis 27. This end portion of the shaft 26 carries the holder 22 for the coupling pins 23. The other end portion of the shaft 26 has a circumferential groove 28 outwardly adjacent to a gear 24 which can be moved into and out of mesh with a gear 30 in response to axial displacement of the shaft 26. The gear 30 is rotatably mounted on the base plate 25 and carries an eccentrically mounted blocking stud or post 45 having a semicircular cross-sectional outline. The gear 24 moves into mesh with the gear 30 when the shaft 26 is moved downwardly, as viewed in FIG. 5, so that the coupling pins 23 enter the adjacent hole of the cassette 15 in the chamber 14 and can receive torque from the spindle 16.

The gear 30 can transmit torque to a gear train including gears 31, 32 and 33. The gear train 31–33 is preferably a step-down transmission and its gear 33 meshes with a straight toothed rack 47 on an L-shaped registering carriage 35. When the coupling pins 23 of the holder 22 on the shaft 26 engage the spindle 16, the gears 30–33 convert the tape movement into a linear movement of the registering carriage 35, i.e., the position of the carriage varies dynamically with tape position. The position of the registering carriage 35 is the dynamical value ananogous to that appearing at the output side of the register unit 211 of FIG. 1. It will be noted that the gears 24 and 30–33 constitute a mechanical equivalent of the converter 205 of FIG. 1, and that the registering carriage 35 is a mechanical equivalent of the registering unit 211. The tape movement registering carriage 35 is mounted for reciprocable movement on an elongated tie rod or guide 41 whose ends are secured to the frame 27 and which is surrounded by a helical spring 40 tending to yieldably bias the registering carriage 35 in a direction to the right, as viewed in FIG. 5. When the gear 30 is caused to rotate in a clockwise direction, as viewed in FIG. 5, the registering carriage 35 is moved in a direction to the left (i.e., the spring 40 stores energy). When the gear 30 is then caused to rotate in a counter clockwise direction, the registering carriage 35 is moved in a direction to the right. Thus, each movement of the registering carriage 35 is an imitation of the tape movement, converted by the gears 30 to 33, and represents the value $a(\phi-\phi_o)$ which only starts to change after one end point of the repetition sequence has been set, as will be described below. When the attachment 10 is idle, the spring 40 maintains the registering carriage 35 in the right-hand end position or starting position of FIG. 5 whereby the right-hand edge face 38 of the registering carriage 35 bears against the shorter arm of an arresting or bypass lever 46 which is fulcrumed at 37 in the frame 27. The longer arm of the lever 46 is then substantially parallel to the tie rod 41. The free end of the longer arm of the arresting lever 46 carries a notched angular abutment or stop 49 which extends into the path of movement of the eccentric post 45 on the gear 30 and which consists of electrically conductive material. The arresting lever 36 itself preferably consists of electrically insulating material and the shoulder in the notch of the stop 49 is preferably in line with the axis of the gear 30; such shoulder is located in the path of movement of the post 45. It will be seen that, when the attachment 10 is not in use, the registering carriage 35 is held in an accurately determined starting position which is defined by the arresting lever 46 and post 45. The position of the arresting lever 46, when engaging with the post 45, constitutes one statically stored or read-only end position for the repetition sequence. The lever 46 is the mechanical equivalent of the storage for $a(\phi)$ of FIG. 1. When the registering carriage 35 assumes its rightmost position, it causes the lever 46 to close a switch including the stop 49 and post 45. These parts or contacts of the switch constitute the mechanical equivalent of the first comparator unit 207 of FIG. 1. The switch indicates whether or not the dynamical output value of the register unit 211, i.e., the instantaneous position of the registering carriage 35, is equal to the static or fixed starting point value for the repetition cycle, which is denoted by the position of the lever 46. The arresting or bypassing lever 46 could be replaced by a fixed stop acting on face 38 of the registering carriage 35. The carriage 35 could arrest the shaft 26 and thus interrupt the tape movement via rack 47 and gears 33, 32, 31, 30 and 24. Thus, the shaft 26 would be arrested after occurrence of a flank changement in the toothed connections. This would result in unpredictable stoppages of the shaft 26 due to backlash in the toothed connections. The lever 46 bypasses all toothed connections except that between the gears 30 and 24 and thus constitutes a means for feeding back a mechanical stop action on to the input side of the gear train while eliminating the effects of backlash between the teeth of rack 47 and gear 33, gears 33 and 32, gears 32 and 31, and gears 31 and 30. This allows for repeated precise setting of the start position of the cycle.

The frame 27 further supports a second tie rod or guide 39 (see FIG. 7) which is parallel to the tie rod 41 and supports a reciprocable L-shaped storing carriage 34 for memorizing the second end point of the repetition sequence. A helical spring 43 (shown in FIG. 5 behind an elongated blocking bar 42) surrounds the tie rod 39 and urges the storing carriage 34 in a direction to the right, i.e., against the registering carriage 35. This occurs when the gear 30 is moved counter clockwise. The carriages 34 and 35 preferably consist of insulating (non-conducting) material. When the carriages 34, 35 assume the starting positions which are shown in FIG. 5, their shorter legs are adjacent to and facing each other. They are provided with contact springs 57, 56 which are respectively secured to cable clamps 59, 58. The clamps 59, 58 are respectively mounted on the shorter legs of the carriages 34, 35. The contacts 57, 56 constitute a comparator switch which is closed as long as the registering carriage 35 is adjacent the storing carriage 34. A flexible electric conductor 50 connects the clamp 59 with a metallic eyelet 55 on the base plate 25. The latter is also a conductor so that it electrically connects the plate 25 with the contact 57.

The arresting lever 46 is biased counter clockwise, as viewed in FIG. 5, by a helical spring 54 which couples its longer arm to the frame 27.

The gear 30 and its eccentric contact post 45 consist of conductive material so that the stop 49 is electrically connected to the eyelet 55 when it engages the post 45 because the gear 30 is mounted on the base plate 25 which supports the eyelet 55.

The aforementioned blocking bar 42 has a rectangular cross-sectional outline (see FIG. 7) and is parallel with and adjacent to the tie rod 39. One side of the bar 42 lies flat against the adjacent surface of the storing carriage 34. This bar is rotatably mounted in the frame 27 and constitutes a holding or arresting means for the storing carriage 34, arresting it in a predetermined position. This action is the mechanical analogue of applying a fixed value to electrical storing means as a read-only value: the instantaneous position of storing carriage 34 at the arresting instant is held or stored by this arresting action. The following table shows the analogy between the mechanical and electronic systems:

| function block | electronic realization | mechanical realization |
| --- | --- | --- |
| converter 205 | opto-electric converter (FIG. 2) | gears 24, 30–33 |
| register unit 211 | counter 313 | carriage 35 |

-continued

| | | dynamically operated by tape movement |
| --- | --- | --- |
| storage for START point | holding or storing a first digital value, e.g., 0000, a first storage register, input to 207 | provision of a limiting stop, either fixed or by means of the bypassing lever 46 |
| storage for END point | storage register 317 | storage carriage 34 arrestable at a chosen distance from stop |
| comparator unit 207 | electronic comparator for binary values | contacts 45, 49 |
| comparator unit 209 | electronic comparator for binary values | contacts 56, 57 |

Figure 7:
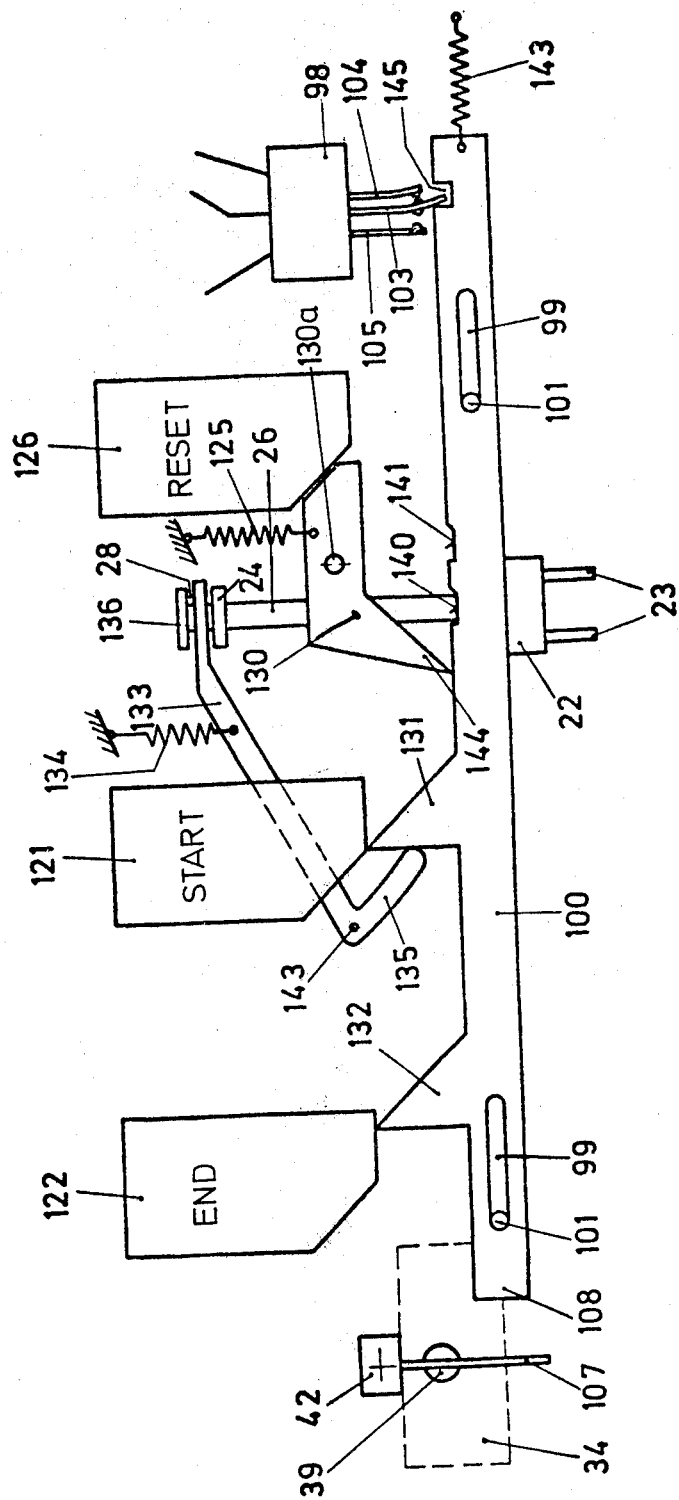
FIG. 7 is an enlarged view of those parts of the attachment which are omitted in FIG. 5.

The means for axially moving the shaft 26 with the holder 22 comprises a shifter lever 135 which is shown in FIG. 7. The end portion 136 of the longer arm 133 of the lever 135 is preferably bifurcated and extends into the circumferential groove 28 of the shaft 26. The shifter lever 135 is fulcrumed at 143 and is biased by a helical spring 134 which tends to move the shaft upwards and thus the gear 24 out of mesh with the gear 30.

FIG. 7 shows the aforediscussed parts 22–24, 26, 28, 34, 39, 42 and the reciprocable slide or rail 100 which has elongated slots 99 for guide pins 101 secured to the casing of the attachment 10. The structure of FIG. 7 constitutes a control means primarily activated by start and stop switches or buttons as will be described, which can activate or deactivate the attachment 10 at the will of the operator.

The slide 100 extends at right angles to the bar 42 and has two triangular motion receiving protuberances or lugs 131, 132, relatively shallow notches 140, 141 and a deeper notch 145. The notch 145 receives the median contact 103 of a two-way control switch 98. The contact 103 can be flexed to engage the adjacent contact 104 or 105 of the switch 98. An arresting lever 130 is fulcrumed at 130a and is biased counter clockwise, as viewed in FIG. 7, by a helical spring 125. The lever 130 has a pointed arm 144 which can enter the notch 140 or 141 of the slide 100, depending on the position of the slide with respect to the lever 130. A helical spring 143 biases the slide 100 in a direction to the right, as viewed in FIG. 7, so that the guide pins 101 normally extend into the leftmost portions of the respective slots 99.

The lever 130 cooperates with the reset-knob 126 which can be depressed to disengage the arm 144 from the slide 100 against the opposition of the spring 125. When the attachment 10 is idle, the contact 103 of the two-way switch 98 engages the contact 104. The start knob 121 (S1 of FIG. 1) cooperates with the lug 131 of the slide 100 and is depressed when the user detects the start of that passage of recorded sound on a selected segment of the tape in the cassette 15 which is to be reproduced once or more than once. The stop knob 122 (S2 of FIG. 1) cooperates with the lug 132 and is depressed when the user detects the end of the aforementioned recorded passage. The bar 42 is connected with a leaf spring 107 which extends into the path of leftward movement of the end portion 108 of the slide 100. The configuration of cooperating inclined surfaces on the start knob 121 and lug 131 is such that, when the knob 121 is depressed, the end portion 108 of the slide 100 moves toward and barely contacts the leaf spring 107, and the notch 140 is located in register with the arm 144 of the lever 130. When the stop knob 122 is depressed, the slide 100 moves the notch 141 into register with the arm 144 and its end portion 108 flexes the spring 107.

FIG. 8 shows the manner in which the levers 7, 8 and 9 can be pivoted in order to actuate the respective buttons 2, 3 and 5. The parts of the attachment 10 are shown in the inoperative or idle positions. The poles of a source of electrical energy are connected to two leads 92 and 94. The lead 92 is connected with a conductor 91 when the flexible median contact 103 of the two-way control switch 98 engages the contact 104. The conductor 91 is electrically connected with a further conductor 93 on closing of a switch 70 whose movable contact can be displaced by a disk-shaped cam 61 on the camshaft 48 which is rotatable by the motor 60 through the medium of a step-down transmission or gear reducer 66. The conductor 93 is connected to one terminal of the motor 60. Another terminal of the motor 60 is connected with the lead 94.

The contact 105 of the switch 98 is connected with the aforementioned eyelet 55 by a conductor 51. When the conductor 51 is electrically connected with the clamp 58 (via conductor 50, clamp 59 and switch 57, 56), it is connected with the conductor 93 via conductor 52 and on closing of a switch 72 whose movable contact is controlled by a second disk-shaped cam 63 on the camshaft 48.

The stop 49 of the lever 46 is connected with a conductor 53 which is connected to the movable contact of a switch 71; this movable contact is controlled by a disk-shaped cam 62 on the camshaft 48. When the cam 62 closes the switch 71, the stop 49 is connected with the conductor 93.

A switch 73 is actuatable by a disk-shaped cam 64 on the camshaft 48 and its contacts are connected with the aforementioned plug 65 which is insertable into the socket 13 of the housing of the tape recorder 1. The cams 61, 62, 63 are respectively formed with angularly offset V-shaped notches or recesses 80, 81, 82. The arrangement is such that the switches 70, 71, 72 respectively open when the teeth of their moving contacts are respectively free to enter the notches 80, 81, 82. The cam 64 has three notches 79, 83, 84 in angular positions respectively corresponding to those of the notches 80, 82 and 81. The switch 73 is closed when the tooth of its movable contact is free to enter one of the notches 79, 83, 84. When the attachment 10 is idle, the switch 70 is open and the switches 71-73 are closed. The novel apparatus comprises the attachment 10 which includes the registering and storing means as well as the comparator means, the lever and camshaft arrangement, driven by the motor 60, which arrangement is the control unit for operating the driving means of the machine, i.e., the tape recorder.

The operation:

The user inserts a conventional cassette 15 into the chamber 14 of the tape recorder 1 while the attachment 10 is held in the open position of FIG. 4. The attachment 10 is thereupon moved to closed position so that the coupling pins 23 of the holder 22 move into register with the spindle 16 and with the corresponding hole of the cassette 15. The plug 65 is inserted into the socket 13. The tape recorder 1 is thereupon operated in the customary way by depressing one of the buttons 2-6.

The playback lever 8 is depressed so that the machine 1 reproduces sound which is stored on the tape. The start knob 121 is depressed when the user detects the beginning of a sound passage which is to be reproduced once or more than once. This causes the lug 131 to move the slide 100 in a direction to the left, as viewed in FIG. 7 or 8, and to stress the spring 143. The leftward movement of the slide 100 is interrupted when its end portion 108 barely contacts the leaf spring 107 and the arm 144 of the arresting lever 130 enters the notch 140.

Thus, the lever 130 then holds the slide 100 in the just described position. While the slide 100 moves in response to depression of the start knob 121, the left-hand side of the lug 131 pivots the shifter lever 135 against the opposition of the spring 134 whereby the bifurcated end portion 136 of the arm 133 moves the shaft 26 axially downwards and places the gear 24 into mesh with the gear 30. Also, the holder 22 moves downwards and introduces the coupling pins 23 into the respective star-shaped opening of the cassette 15 so that the shaft 26 is rotated in response to rotation of the spindle 16. The pins 23 automatically find their way into the registering opening because the opening is provided in the supply reel and the latter is rotated by the spindle 16 or by the tape. Therefore, the spindle 16 drives the gear 30 which, in turn, transmits torque to the gear train 31-33 whose gear 33 moves the rack 47 and hence the registering carriage 35 in a direction to the left to stress the spring 40. The construction of the two-way control switch 98 is such that its contact 103 continues to engage the contact 104 while the arm 144 extends into the notch 140 of the slide 100. The motor 60 is still idle because the switch 70 is open, i.e., the conductor 91 is disconnected from the lead 94.

During reproduction of sound which is stored on the tape, the spindle 16 rotates in a counterclockwise direction, as viewed in FIG. 3. Consequently, and as mentioned above, the rack 47 moves the registering carriage 35 against the opposition of the spring 40 as soon as the spindle 16 begins to rotate the shaft 26 via coupling pins 23. The shorter leg of the registering carriage 35 bears against the shorter leg of the storing carriage 34 and pushes the latter against the opposition of the spring 43. FIG. 5 shows that, when the spindle 16 rotates the gear 24 in a counterclockwise direction, the gear 30 is driven clockwise and moves the post 45 away from the stop 49 on the arresting lever 46. The ratio of the step-down transmission or gear train 31-33 between the gear 30 and the rack 47 is preferably such that the translatory movement of rack 47 in a direction to the left, as viewed in FIG. 5, suffices to enable the lever 46 to move the stop 49 out of the path of the post 45 before the gear 30 completes a full revolution. The lever 46 is biased counterclockwise, as viewed in FIG. 5, by the spring 54. The path for the post 45 is now free and unobstructed not later than when the gear 30 completes one full revolution in a clockwise direction. The rear or trailing end of that sound passage which is to be reproduced once or more than once is determined by depressing the motion terminating stop knob 122. The lug 132 then shifts the slide 100 further on in a direction to the left, as viewed in FIG. 7 or 8, so that the arm 144 of the lever 130 enters the notch 141. The end portion 108 of the slide 100 thereby flexes the leaf spring 107 which latter turns or tends to turn the bar 42 in a clockwise direction, as viewed in FIG. 7. The bar 42 is immediately adjacent to the storing carriage 34 and, when it turns or tends to turn in response to flexing of the leaf spring 107, it causes the storing carriage 34 to bear against the tie rod 39 with a force which suffices to prevent further sliding movement of the storing carriage 34 along the tie rod. Thus, the spring 107 cooperates with the bar 42 to block further movement of the storing carriage 34 and to positively hold the carriage 34 in the selected position. The storing carriage 34 then holds its position as a read-only mechanical value. The arresting or holding action remains unchanged because the arm 144 of the lever 130 extends into the notch 141 and maintains the slide 100 in the position which the slide assumes on depression of the motion terminating stop knob 122.

The contact 103 of the control switch 98 is disengaged from the contact 104 and engages the contact 105 when the user depresses the stop knob 122 and the slide 100 assumes that position in which the arm 144 extends into the notch 141. Consequently, the contacts 103 and 105 complete a circuit including the lead 92, conductor 51, eyelet 55, conductor 50, clamp 59, switch 56, 57, clamp 58, conductor 52, switch 72 and conductor 93, i.e., the circuit of the motor 60 is completed and the transmission 66 drives the camshaft 48. The latter rotates in a counterclockwise direction, as viewed from the right-hand side of FIG. 8, and causes the cam 64 to immediately open the switch 73. This results in immediate stoppage of drive means 1a in the housing of the tape recorder 1 (note that the plug 65 in the socket 13 is in the circuit of such drive means).

In order to insure that the drive means 1a (FIG. 4) of the tape recorder 1 is arrested not later than when the bar 42 blocks further translatory movement of the storing carriage 34 (this could happen because the motor 60 is started with a certain delay following depression of the stop knob 122), the slide 100 is preferably configurated in such a way that the contact 103 of the control switch 98 is moved into engagement with the contact 105 before the arm 144 of the lever 130 enters the notch 141, i.e., before the end portion 108 of the slide 100 flexes the leaf spring 107 to the extent which is necessary to block further translatory movement of the storing carriage 34. In other words, the drive means 1a of the tape recorder 1 is arrested not later and preferably before the storing carriage 34 is arrested by the blocking bar 42.

As the camshaft 48 rotates in response to starting of the servomotor 60, the cams 18-20 also turn in a counterclockwise direction, as viewed from the right-hand side of FIG. 8. During the first stage of rotation of the camshaft 48, the cam 18 pivots the lever 7 so that the upper arm 151 of the lever 7 depresses the stop button 2 of the tape recorder. During the next-following stage of rotation of the camshaft 48, the cam 20 causes the arm 153 of the lever 9 to depress the rewind button 5. The buttons 2-6 are biased to their extended (non-depressed) positions by suitable springs (not shown) so that the stop button 2 returns to the extended position when the lever 9 depresses the rewind button 5. Such movements of the levers 7 and 9 are terminated before the notches 82, 83 of the cams 63 and 64 respectively reach the teeth of movable contacts of the respective switches 72 and 73. Thus, the tape recorder 1 is ready for rapid rewinding of magnetic tape onto the supply reel (spindle 16). However, the drive means 1a of the tape recorder 1 is still idle because the switch 73 is open.

When the notch 82 of the cam 63 reaches the movable contact of the switch 72, the latter opens to thus arrest the motor 60. At the same time, the notch 83 of the cam 64 reaches the moving contact of the switch 73 and allows the moving contact to engage the other contact so that the switch 73 closes and completes the circuit of the drive means 1a. Since the rewind button 5 is still depressed by the lever 9, the tape in the cassette 15 is rapidly rewound onto the supply reel. This causes the spindle 16 to rotate in a clockwise direction, as viewed in FIG. 4. The pins 23 transmit torque to the gears 24, 30 and 31-33. The gear 30 is driven counterclockwise, as viewed in FIG. 8, so that the rack 47 moves the registering carriage 35 in a direction to the right, i.e., the spring 40 dissipates energy. The comparator switch 56, 57 opens because the blocking bar 42 holds the storing carriage 34 against movement under the bias of the spring 43. The rewinding of magnetic tape onto the supply reel in the cassette 15 continues until the edge face 38 of the registering carriage 35 reaches the shorter arm of and pivots the lever 46 in a clockwise direction, as viewed in FIG. 5, i.e., the spring 54 stores energy and the stop 49, one of the comparator contacts, returns into the path of movement of the post 45 (the other comparator contact) on the gear 30. That position of the gear 30 in which the post 45 reengages the shoulder of the stop 49 corresponds to the desired starting position of the tape for renewed reproduction of sound on a selected segment of the tape.

Thus, the comparator (45, 49) detects the coincidence of register means position and start point position.

When the post 45 engages the stop 49, the circuit of the motor 60 is completed via lead 92, contacts 103, 105 of the control switch 98, conductor 51, eyelet 55, base plate 25, gear 30, post 45, stop 49, conductor 53, switch 71 and conductor 93. The motor 60 causes the transmission 66 to rotate the cam-shaft 48 whereby the cam 64 immediately opens the switch 73 to arrest the drive means 1a of the tape recorder 1. It might be desirable to open the circuit of the drive means 1a shortly prior to actual stoppage; this reduces the wear upon such drive means.

As the camshaft 48 rotates, the cam 18 causes the lever 7 to depress the stop button 2 of the recorder. In response to continuing rotation of the camshaft 48, the cam 19 causes the arm 152 of the lever 8 to depress the playback button 3 so that the tape recorder 1 is set for reproduction of sound on the aforediscussed selected segment of the magnetic tape. It is preferred to select the configuration and angular positions of the cams 18-20 on the camshaft 48 in such a way that the transition from depression of the stop button 2 to depression of the button 3 or 5 (or vice versa) takes place gradually. This reduces the likelihood of generation of noise which could be bothersome to the user, for example, to a student who wishes to listen again to a selected passage of sound which is recorded on the magnetic tape.

The just described stages of operation are completed before the notch 81 of the cam 62 reaches the tooth on the moving contact of the switch 71 and allows the latter to open, and before the notch 84 of the cam 64 allows the switch 73 to close.

When the switch 71 opens, the circuit of the motor 60 opens and the camshaft 48 is arrested. This takes place simultaneously with closing of the switch 73 which completes the circuit of the drive means 1a. The lever 8 maintains the playback button 3 in depressed position so that the tape recorder 1 reproduces the sound which is recorded on the selected segment of magnetic tape. The gear 24 is rotated counter clockwise and drives the gear 30 in a clockwise direction. Therefore, the contact post 45 moves away from the contact stop 49. Also, the gear train 31-33 causes the rack 47 to move the registering carriage 35 away from the right-hand end position, as viewed in FIG. 5, and the spring 54 moves the stop 49 away from the path of movement of the post 45. When the registering carriage 35 reaches the storing carriage 34 (which is still blocked by the bar 42 and therefore stores the fixed end point value of the sequence), the comparator switch 56, 57 closes to complete the circuit of the motor 60 via 58, 52 and 72. Thus, the registering carriage 35 comes to a halt at the exact moment when the reproduction of sound on the selected segment of magnetic tape in the cassette 15 is completed, as a result of position comparison of registering carriage 35 and storing carriage 34.

Since the motor 60 is on, the camshaft 48 rotates the cams 61–64 whereby the cam 64 immediately opens the switch 73 to open the circuit of the drive means 1a. The cam 18 causes the lever 7 to depress the stop button 2 and the cam 20 thereupon causes the lever 9 to depress the rapid rewind button 5. The movements of the levers 7 and 9 in a direction to depress the respective buttons 2 and 5 are terminated before the cam 63 opens the switch 72 to thereby arrest the motor 60. Such opening of the switch 72 takes place simultaneously with closing of the switch 73 (because the notch 83 of the cam 64 allows the movable contact of the switch 73 to engage the other contact). Thus, the drive means 1a of the tape recorder 1 is on and, since the rewind button 5 is depressed, the aforediscussed segment of magnetic tape is rapidly rewound onto the supply reel in the casing of the cassette 15. The reproduction of sound on the selected segment of magnetic tape is thereupon repeated in the aforediscussed manner as often as the user desires.

If the user wishes to avoid further reproduction of sound on a selected segment of the tape, the reset knob 126 is depressed whereby the arm 144 of the lever 130 is expelled from the notch 141 of the slide 100 and the spring 143 is free to contract and to return the slide to the starting position of FIG. 7. The end portion 108 of the slide 100 is disengaged from the leaf spring 107 and the bar 42 ceases to block the storing carriage 34. The spring 143 is strong enough to cause the inclined cam face of the lugs 131, 132 to return the knobs 121, 122 to the extended positions of FIG. 7. The spring 134 maintains the shorter arm of the shifter lever 135 in contact with the adjacent edge face of the lug 131 so that the end portion 136 of the arm 133 raises the shaft 26 thus disengaging the coupling pins 23 from the spindle 16 and, the gear 24 from the gear 30 which allows the springs 40 and 43 to return respectively the registering carriage 35 and storage carriage 34 to the starting positions shown in FIG. 5. The slide 100 returns the contact 103 of the control switch 98 into engagement with the contact 104 so that the circuit of the motor 60 is completed via 91, 70, 93. The motor 60 drives the camshaft 48 until the cam 61 allows the switch 70 to open and to thus arrest the motor 60. This completes the return movement of all components of the attachment 10 to their idle positions. The tape recorder 1 is set for reproduction of sound even if the repetition of reproduction of sound on a selected segment of the tape is terminated during rewinding of tape onto the supply reel because, when the cam 61 reaches the angular position of FIG. 8 to open the switch 70, the levers 8 and 9 have caused the rewinding of tape onto the supply reel and set the tape recorder 1 for playback.

As mentioned above, the springs 40 and 43 are free to expand as soon as the coupling pins 23 are disengaged from the spindle 16. The registering carriage 35 then maintains the lever 46 in the position of FIG. 5, i.e., the shoulder of the comparator stop 49 extends into the path of movement of the comparator post 45. The user is free to depress any selected button (2–6) of the tape recorder 1.

A different segment of the tape in the cassette 15 can be selected for repeated reproduction of sound thereon in the previously described manner. Thus, the user first depresses the start knob 121 at the start of reproduction of freshly selected sound passage, and the user depresses the motion terminating stop knob 122 when the playback of the selected sound passage is completed.

In accordance with a modification, the start knob 121 can be omitted if the attachment is designed in such a way that the coupling pins 23 automatically engage with the spindle 16 (or with a part which receives torque from the spindle 16) when the attachment 10 is moved from the open position of FIG. 4 to the closed position in which it overlies the chamber 14 for the cassette 15. This results in substantial simplification of the attachment because the shaft 26 need not be mounted for axial movement but is merely rotatable in the base plate 25 and/or frame 27 while the gear 24 remains in permanent mesh with the gear 30.

FIG. 9 shows the electronic version of the apparatus in analogy to the representation of FIG. 8. It makes use of the electronic circuit shown in FIG. 3. The parts which are used in this embodiment and which are identical with or analogous to those in the mechanical embodiment of FIG. 8 are denoted by similar reference characters. A slide 100 is again provided with elongated slots 99 for guide pins 101. The means for moving the shaft 26 for the holder 22 comprises a shifter lever 135. The end portion 136 of the longer arm 133 of the lever 135 is again bifurcated and extends into the circumferential groove 28 of the shaft 26. The shifter lever 135 is fulcrummed at 143 and is biased by a helical spring 134 which tends to move the gear 24 out of mesh with the gear 30. The slide 100 has only one triangular motion receiving protuberance or lug 131 and one relatively shallow notch 140. Again, an arresting lever 130 is provided which is fulcrumed at 130a and is biased counter clockwise by a helical spring 125. The lever 130 has a pointed arm 144 which can enter the notch 140 of the slide 100 depending on the position of the slide with respect to the lever 130. The helical spring 143 biases the slide 100 in a direction to the right so that the guide pins 101 normally extend into the leftmost portions of the respective slots 99.

The start knob 121 cooperates with the lug 131 of the slide 100 and is depressed when the user detects the start of that passage of recorded sound on a selected segment of the tape in the cassette 15 which is to be reproduced once or more than once. Activating, i.e., pushing down of the start knob 121 results in movement of the slide 100 into a direction to the left. The pointed arm 144 of the lever 130 enters the notch 140 so that the slide 100 is arrested in the corresponding position against the bias of the helical spring 143. Activation of the start knob 121 further causes the shifter lever 135 to pivot in a clockwise direction so that the pins 23 enter the adjacent hole of the cassette as was described before and the gear 24 mates with the gear 30. Thus, the movement of the tape is transmitted to the gears 30, 31 and 32 which rotate a coding disc 300 (see also in FIG. 2). The start knob 121 closes on its way down a resetting 320.

The coding disc 300 cooperates as shown in details in FIG. 2 with an opto-electric transducer unit 322 which may comprise a light-emitting diode and a phototransistor connected to an operational amplifier and a pulse shaping unit so that, after actuation of the start knob 121, an electrical pulse train will appear on a clock line 324. The start knob 121 is analogous to the start switch $S_1$ of FIG. 1. In FIG. 3 the start switch $S_1$ connects the electrical output signals of a mechanical-electrical convertor which connects the mechanical movement of the tape with electrical signals, to the register unit formed by counter 313. In FIGS. 1 and 9 the start knob $S_1$ and 121 respectively connect the mechanical signal, i.e., the tape movement to the input of a mechanical-electrical convertor 205 and 30, 31, 32,300, 322 respectively. Whether a start knob is arranged at the input or at the output side of the convertor is of no consequence and is only a matter of construction. The representation of FIG. 3 was chosen to render the action of the start switch $S_1$ clear with respect to the following electronics. In FIG. 9 the pulse train on the clock line 324 is led via an up-count/down-count-controlling unit 323a (comprising a controlling flip-flop 323 and logic gates as shown in FIG. 3) to the respective clock inputs of the counter 313.

Closing of the resetting switch 320 by actuation of the start knob 121 provides a reset signal via conductor 328 which resets the count control flip-flop 323 in unit 323a as well as the counter 313. Thus, after activation of the start knob 121 the pulse train in the clock line 324 is led to the up-count clock input of the counter 313 which now starts to count upwards departing from zero. The output of the counter 313 is transmitted via lines A to Z to the inputs of the register 317 which is still inhibited from storing data due to the fact that an enabling input connected to enabling line 326 is not activated.

As soon as the operator finds that the just heard tape sequence should be repeated, he actuates a stop switch key 327 which actuates an enabling switch 329. On depression of the key 327, an enabling pulse is produced by switch 329 on line 326 to the enabling input of parallel in/parallel out register 317 (this can also be performed by an interconnected flip-flop as shown in FIG. 3). Thus, the next-following pulse of the pulse train on clock line 324 which is also connected to the clock-in input of register 317 will enter the counter output data into the register 317 which data is available at the counter output at the moment of actuation of the stop switch 327. From this instant, the end point of the tape sequence to be repeated is statically stored in register 317 as a read-only value and will not be influenced by further output data of the counter 313. As the signal at the output of the register 317 is immediately transmitted to the second comparator unit 209, which produces a control signal when the register output data equal the counter output data, the comparator unit 209 will produce a second control signal when the switch 327 is actuated. The counter output is further connected to the first comparator unit 207 the second input of which being connected to a further register to pre-select the start point position of the tape sequence to be repeated or directly to electrical zero as a fixed or read-only value, stored for defining the start of the repetition cycle. The first comparator unit 207 will produce a first control signal as soon as the counter output data coincide with the statically stored comparison data, e.g., and as shown in FIG. 3 or 9, as soon as the counter output data equal zero.

Thus, here again, the dynamic value at the output of the counter as output-part of the detector is compared with two fixed read-only values at least one of which is stored in a register, and the other of which can be stored in a second register (not shown) or is absolutely fixed by pre-selecting the appropriate digital value, e.g., zero. The second comparator unit 209 produces, as described, a second control signal when the counter output data match the register output data as first read-only value and the first comparator unit 207 produces a first control signal when the counter output data match the pre-selected or stored second read-only value.

As soon as the operator depresses the start knob 121, the first comparator unit 207 produce the first control signal because the counter output stands on zero, the same value as the fixedly stored value led for comparison to the first comparator unit. This first control signal is transmitted via line 331 to one input of an AND gate 333 the other input of which is connected to an output of a flip-flop 335. The flip-flop 335 is reset in response to depression of the start knob 121 so that the first control signal will cause no action of the control switches for stop, playback and rewind (2, 3, 5) of the tape recorder. When the stop key 327 is depressed, the second comparator unit 209 produces a second control signal which is transmitted via line 337 on to a monostable multivibrator 339 which latter produces on detection of the raising edge of said second control signal a single pulse of preselectable width. This single pulse is transmitted via line 341 and OR 343 gate on to a stopkey driver unit 345 which energizes a solenoid 347 by means of which the stop key 2 is depressed through the medium of the lever 151. On depression of the stop key 2, the playback key 3 of the tape recorder is released and the tape recorder will thus stop its action. The falling edge of the single pulse emitted by the monostable multivibrator 339 triggers a second monostable multivibrator 349 which produces a single pulse of preselected length which is transmitted via line 351 on to a rewind key driver unit 353. The driver unit 353 energizes a second solenoid 355 which depresses via lever 153 the rewind button 5 of the tape recorder. Thus, after having been stopped, the tape recorder will be actuated to rewind operation and the tape will be rewound from the end of the sequence to be repeated towards its beginning point. The single pulse emitted by the monostable multivibrator 339 sets the flip-flop or bistable multivibrator 335 in such a way that an enabling signal is transmitted to the AND gate 333. As soon as the counter reaches zero, i.e., the second fixed value, the first comparator unit 207 again produces a first control signal which is now, due to the action of the flip-flop 333, transmitted to a monostable multivibrator 357 which then produces a single pulse of preselected length. This pulse is transmitted via OR gate 343 again to the input of stop driver unit 345 which energizes the solenoid 347 so that the tape recorder is again stopped. The falling edge of the single pulse emitted by the monostable multivibrator 357 triggers a further monostable multivibrator 359 which, after the tape recorder has been stopped, produces a single pulse of preselected length which is transmitted to a play key driver unit 361. The driver unit 361 energizes a third solenoid 363 by which the playback key 3 is depressed by means of the lever 152. As the play key as well as the rewind key will hold themselves respectively in lower (i.e., depressed) positions, once depressed the two activating solenoids 355 and 363 are only energized respectively for a short period of time, namely, for the duration of pulses transmitted by the monostable multivibrators 359 or 349. These two keys are released each as soon as the stop switch 2 is activated, whereas the stop key is released on depression of the key 3 or 5.

To insure a higher accuracy in locating the starting point of the tape sequence to be repeated by a mechanical stop as was described in FIG. 8, the lever 46 again cooperates with the stop 49 on the post 45 of the gear 30. As soon as the first control signal appears at the output of the gate 333, a bistable multivibrator or flip-flop 365 is set and its output signal energizes a solenoid 367. Energization of the solenoid 367 results in movement of the lever 46 into the path of movement of the post 45. The flip-flop 365 is reset after the stop key 2 is released on depression of the playing key 3 under the action of monostable multivibrator 359.

It is clear that the entire control unit 215 is installed in the attachment 10; it is shown outside of the frame 27 for the sake of clarity.

Figure 10:
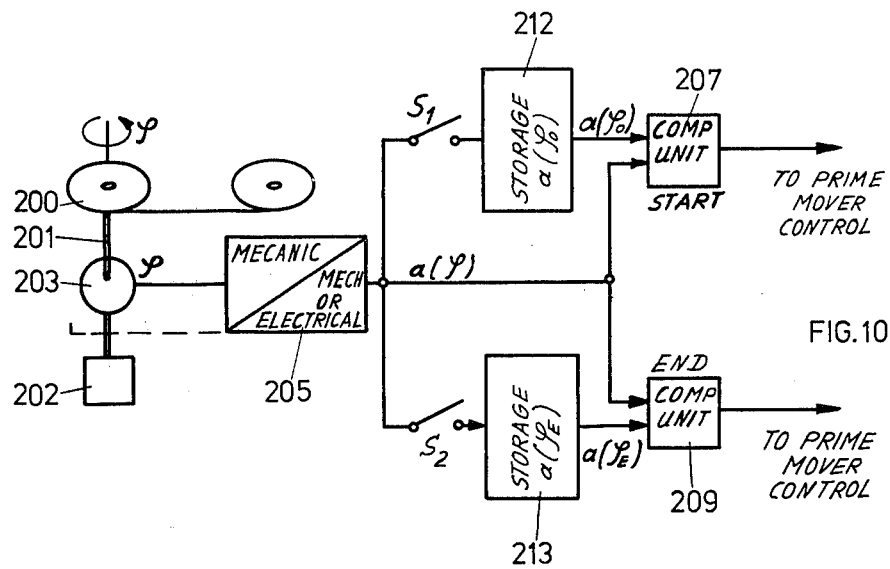
FIG. 10 is a block diagram of a second form of the invention.

FIG. 10 shows a slightly modified version of the apparatus represented by the block diagram of FIG. 1. The output signal a($\phi$) of the converter unit 205 which converts the tape movement into another mechanical movement or into an electrical signal varying in time, and which is basically a detector serving to monitor the movement of the tape is transmitted to a first storage 212 when the start switch $S_1$ is closed. The operator closes the start switch $S_1$ during listening to the information stored on the tape when he wants to set the start point of a tape sequence subsequently to be repeated. Therefore, the detected and converted value a ($\phi_o$) according to the selected tape position $\phi_o$ is stored as a fixed or read-only value in the storage 212. The operator closes the stop switch $S_2$ when detecting the end of the sequence to be repeated, whereby the output signal of the detector and converter 205 is transmitted to the second storage 213 where a value a ($\phi_E$) is held according to the end point ($\phi_E$) of the tape sequence to be repeated. The signals at the outputs of the storages 212 and 213 are respectively transmitted to the first inputs of comparator units 207 and 209. The second inputs of the units 207 and 209 are connected to the output of the detector 205. Comparator unit 207 produces a first control signal as soon as the output signal of the detector 205 equals the output signal of the storage 212, and the comparator unit 209 produces a second control signal as soon as the output signal of the detector 205 equals the output signal of the storage 213. Both control signals are transmitted to the prime mover control unit 215 which may be constructed in a manner as shown in FIG. 9.

Figure 11A:
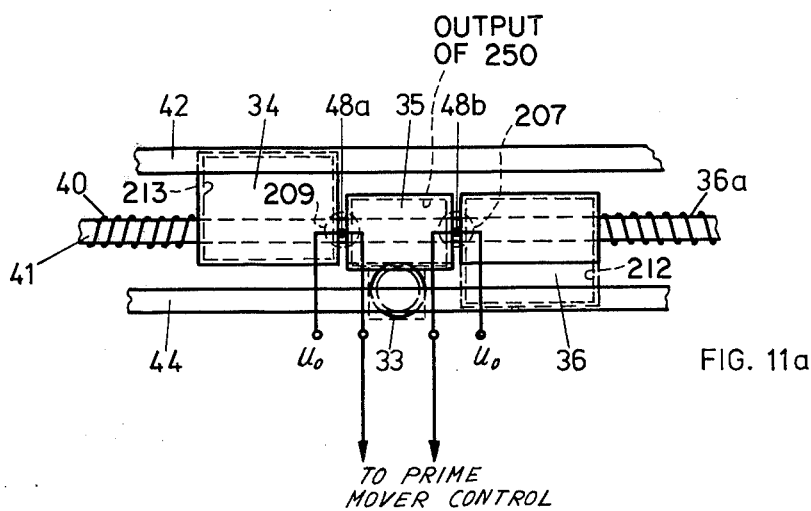
FIGS. 11a and 11b respectively show, in a plan and in a front elevational view, certain parts of an attachment as shown in FIG. 5 to realize mechanically the form of FIG. 10.
Figure 11B:
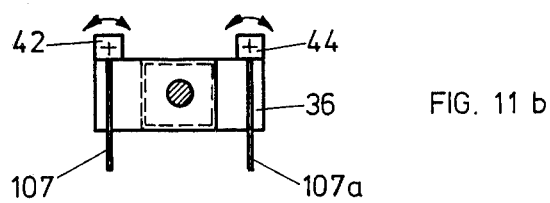

FIGS. 11a and 11b show the mechanical realization of the block diagram of FIG. 10.

FIG. 11a shows a part of the attachment 10 in analogy to FIG. 5. A storing carriage 34 is reciprocable along a guide rod 41 and is biased by a spring 40 in a direction to the right, as viewed in FIG. 11a. The gear 33 meshes with a rack of a registering carriage 35 which is also reciprocable along the rod 41. Gears 24, 30, 31 and 32 (not shown in FIG. 11a) the gear 33 and the registering carriage 35 constitute the detector unit 205. As an analog of the start point storage 212 of FIG. 10, a second storing carriage 36 is provided on the rod 41 and is biased by a spring 36a in a direction to the left, as viewed in FIG. 11a. A blocking-bar 42 of rectangular or square cross section (see FIG. 11b) is adjacent to one side of the storing carriage 34 which slides therealong when moved by the registering carriage 35 in a direction to the left towards its end position. Actuation of a stop knob corresponding to the knob 122 of FIG. 7 results in flexing of a leaf spring 107 which is fixed to the blocking bar 42 as shown in FIG. 11b so that the storing carriage 34 is fixed in its selected position. A second blocking bar 44 is provided for the second storing carriage 36. Actuation of a start knob corresponding to the knob 121 of FIG. 7 results in flexing of a leaf spring 107a which is fixed to the second blocking bar 44 as shown in FIG. 11b.

The registering carriage 35 is moved in a direction to the left (as viewed in FIG. 11a) by the gear 33 when the attachment 10 is coupled with the pins 23 as shown in FIG. 7 and the tape is moved in playback direction. The carriage 35 then shifts the storing carriage 34 against the opposition of the spring 40, i.e., in a direction to the left, whereby the second storing carriage 36 follows the movement of the registering carriage 35 under the action of the spring 36a. When the left spring 107a is flexed as a result of actuation of a start knob (not shown), the second storing carriage 36 is arrested and fixed whereas the registering carriage 35 continues to move in a direction to the left and moves the first storing carriage 34. Actuation of the stop knob (not shown) results in flexing of the leaf spring 107 whereby the bar 42 arrests the first storing carriage 34 so that the end point of the tape sequence to be repeated is held as a fixed or read-only value. Two pairs of contacts 48a and 48b provide control signals for the motor 60 of FIG. 8 in analogy to the contacts formed by parts 45, 49 on the one hand, and 56, 57 on the other hand. It will be noted that the embodiment of FIG. 11 differs from that of FIG. 8 only in that the start position of the tape sequence to be repeated can be set by means of a separate storage any time after the attachment 10 has been operatively coupled to the tape driving means.

Figure 12:
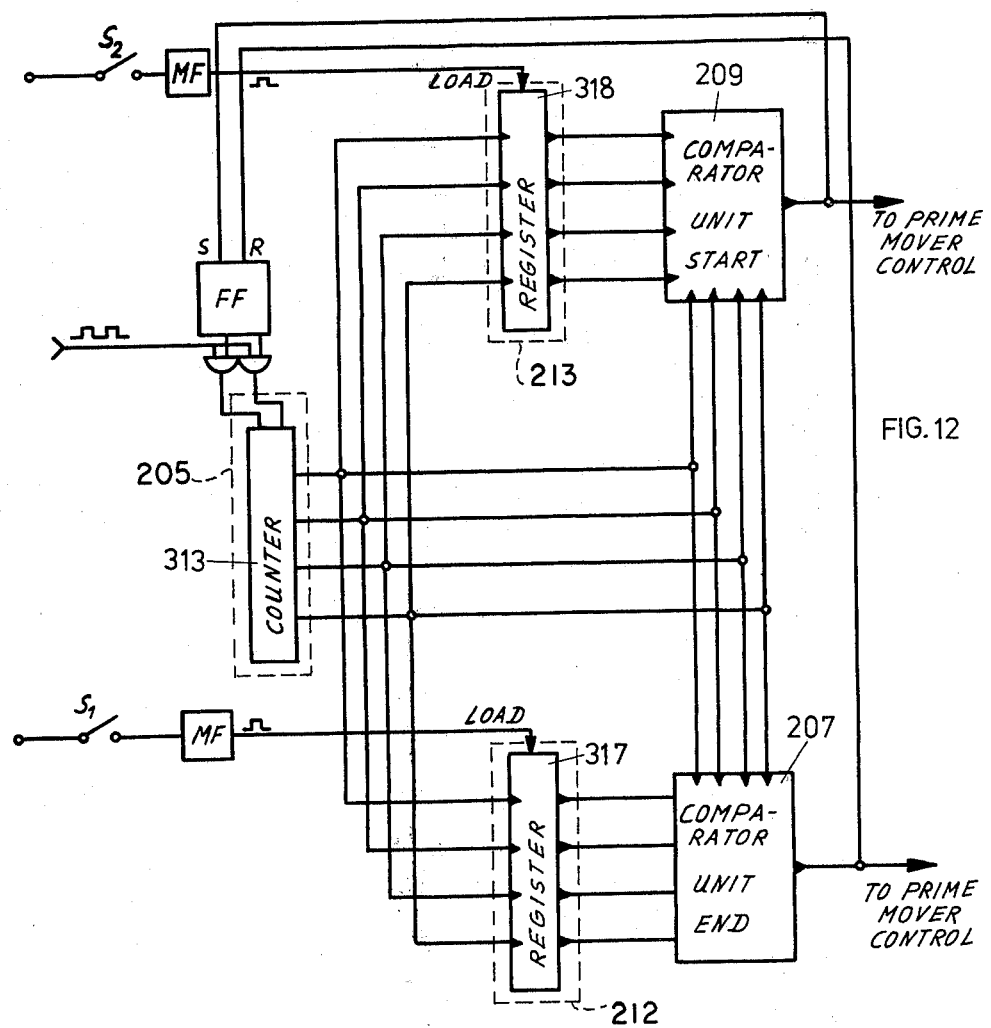
FIG. 12 shows an electronic version of the apparatus of FIG. 10.

FIG. 12 shows an electronic realization of the block diagram of FIG. 10 whereby the comparator units can be constructed in a manner as shown in the embodiment of FIG. 3. The signal at the output of a counter 313, same as shown in FIG. 3, is transmitted to the inputs of two parallel in/parallel out storing registers 318 and 317 respectively which store the counter output data when the operator actuates the start switch $S_1$ or the stop switch $S_2$, respectively.

The signals at the outputs of the two registers which store the start and the end values of the tape sequence to be repeated as read-only values are transmitted to a first set of inputs of comparator units 207, 209 respectively, and the second inputs of these comparator units are connected to the output of the counter 313. The first comparator unit 207 produces a first control signal as soon as the counter output data equal the output data of the first register 317, the start point register, whereas the second comparator unit 209 produces a second control signal as soon as the output data of the end-point register 318 equal the counter output data. The control signals furnished by the comparator units 207 and 209 are transmitted to a prime mover control unit as shown in FIG. 9 and are further used to control up-count and down-count operation of the counter 313 in a manner as described in connection with FIG. 3.

It will be readily appreciated that the heretofore described and shown embodiments constitute but a few of apparatus for use with tape recorder machines which can be constructed and assembled in accordance with the broadest aspects of the invention. A feature common to all of the embodiments is that the system renders it possible to memorize two fixed values which remain unchanged irrespective of the number of repeat cycles and are respectively indicative of the start and end points of the selected repeat cycle. This insures that errors which arise due to the delay with which a tape recorder reacts in response to transmission or control signals cannot be totalized to cause a shifting and/or change in the length of segments containing intelligence which is to be reproduced again, either once or more than once. Otherwise stated, the repeat cycles are not affected by eventual inaccuracies in the start and/or termination of the preceding cycle or cycles because the start and end points of each cycle are controlled by fixed or read-only values, a dynamic value being altered between such read-only values. The improved system can be used by students and music lovers as well as for a host of other purposes. For example the magnetic tape can store information in the form of digital data which can be recorded on one or more tracks of the tape or in the form of a pulse code modulated signal. The modulation techniques for the magnetic tape signals are well known to persons skilled in art. It is also possible to provide one separate track of the tape with coded pulse signals and to detect such signals on the tape by a reading head furnishing directly the electrical clock pulses as has been described in connection with FIG. 2 where the electrical clock pulses are produced by an opto-electronic converter. Finally, it is also within the purview of the invention to install the start and end switches at a locus which is remote from the tape recorder. Referring to FIG. 9, this could be achieved by controlling the coupling of the shaft 26 with the pins 23 to the tape reel by means of a remotely controlled solenoid instead of direct mechanical coupling. This is advisable when the improved apparatus is used to insure repeat reproduction of intelligence which is stored on several tapes, each in a different recorder. For example, a teacher can control with a single set of operating knobs a plurality of tape recorders each provided with an appropriate apparatus with storages. The exact manner in which the single apparatus can be combined with several tape recorders to transmit appropriate start and stop signals for repeat cycles will be readily conceived by those possessing the necessary skill in the art. Reference may be had to U.S. Pat. No. 2,800,531 granted July 23, 1957 to Kobler. The following is a list of electronic components which may be used in the apparatus of the present invention:

| Reference Number | Function: | Maker: |
| --- | --- | --- |
| 313 | synchronous 4 bit up/down counter dual clock with clear | Texas Instruments SN 74 193 TTL |
| 318, 319 | 4 bit parallel-access shift register | Texas Instruments SN 74 195 |
| 315, 339 | monostable multivibrator | Texas Instruments SN 74 121 |
| 349, 357, 359 | | |
| 321, 333, 325 | AND gate | Texas Instruments SN 7409 (open collector) |
| 319, 323, 335 | flip-flop (J-K master-slave) | Texas Instruments SN 744 111 |
| 365 | | |
| 345, 353, 361 | drivers for solenoids | TTL-compatible relais for higher current switching |
| 343 | OR gates | Texas Instruments SN 7432 |

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. Apparatus for effecting single or plural reproduction of intelligence on a selected portion of tape between selected start and end points in a machine wherein intelligence is stored on magnetic tape and which includes rotary means for playing out and collecting the tape, means for driving said rotary means in either direction and means for operating said driving means, said apparatus comprising detector means for monitoring the momentary position of the tape and for converting the same into a varying physical indication; and means for controlling the operation of the machine independently from any information recorded on the tape, including first storing means for storing a first physical value representative of said start point second storing means for storing a second selected physical value representative of said end point;

at least said second storing means being connected to said detecting means for obtaining said varying physical indication therefrom for storing as said physical value comparator means coupled to said first and second storing means and to said detector means, said comparator means including means for generating a first control signal for operating the machine in a playback mode when said physical indication matches said first stored value, and means for generating a second control signal for operating the machine in a revived mode when said physical indication matches said second stored value; and operating means connected to said comparator means and responsive to said first and second control signals for actuating the machine for operation in said modes.

2. The apparatus of claim 1, wherein at least one of said storing means comprises a settable storage which, after setting, acts as a readonly storage.

3. The apparatus of claim 1, wherein at least one said second storing means comprises an electronic storage.

4. The apparatus of claim 3, wherein said electronic storage include, at least one digital storing register.

5. The apparatus of claim 1, wherein said detector means comprise an optical coded disc, a light emitter/receiver-set, operatively connected with said disc, and means for coupling said disc to said rotary means.

6. The apparatus of claim 1, wherein said detector means comprise (a) a converter with input and output means, said input means sensing the movement of said tape, said output means transmitting an electrical pulse for each sensed incremental movement of said tape;

(b) electronic counter means with input means for electrical pulses to be counted and output means to transmit an electrical signal according to the momentarily count value;

and wherein said comparator means comprise two electronic comparators with first and second input means and with output means each, said storage means comprising electronic storage means with input and output means, the output means of the electronic counter means being connected with the first input means of said two comparators, and being connectable to the input means of said electronic storage means for loading the transmitted electrical signal into said storage means, the second input means of at least one of the electronic comparators being connected to the output means of said electronic storage means.

7. The apparatus of claim 6, wherein said electronic storage means comprise two electronic storages with input and output means each, the input means being each connectable to the output means of the electronic counter for respectively loading an electrical signal into said storages, and wherein the second input means of one electronic comparator are connected with the output means of one electronic storage whereas the second input means of the other electronic comparator are connected with the output means of the other electronic storage.

8. The apparatus of claim 1, wherein said detector means comprise up and down counter means the mode of count of which is controlled by the comparator means.

9. The apparatus of claim 1, wherein the generating means of said comparator means are connected to said control means and the latter are connected to said operating means.

10. The apparatus of claim 9, wherein said control means comprise a logic circuitry with first and second input means, and with reset input means and further with first, second and third output means, the first output means controlling, when activated, said driving means into stop mode, the second output means controlling, when activated, said driving means into playback mode, and the third output means controlling, when activated, said driving means into rewind mode, the first and second input means being connected each to said generating means the first output means being activated by activation of the first input means under the condition that since the reset input means had last been activated, the second input means had been activated, the first output means being also activated by activation of the second input means, the second output means being activated, after said first output means, by activation of said first input means and said third output means being activated, after said first output means, by activation of said second input means.

11. The apparatus of claim 1, wherein said rotary means are coupled to arresting means, and wherein said comparator means comprise generating means for generating a stop signal, and wherein feedback means are provided with input means coupled to said stop-signal generating means and with output means coupled to said arresting means, for arresting said rotary means in response to said stop signal.

12. The apparatus of claim 1, wherein said detector means comprise a mechanical/mechanical motion converter.

13. The apparatus of claim 12, wherein said converter comprise a gear train.

14. The apparatus of claim 13, further comprising operator-actuated means for coupling said gear train with said rotary means.

15. The apparatus of claim 12, wherein said converter comprise a mobile registering carriage which is movable as a function of changes in the position of the tape.

16. The apparatus of claim 15, wherein said rotary means are coupled to mechanical arresting means, and further comprising a feedback member movable by said registering carriage, said member constituting a mechanical stop cooperating with said arresting means.

17. The apparatus of claim 15, comprising means for setting said storing means, wherein said storing means comprise at least one storing carriage which is movable by said registering carriage, said means for setting said storing means comprising means for arresting said storing carriage in a position corresponding to one end position of the tape sequence to be repeated.

18. The apparatus of claim 17, wherein said comparator means comprise two pairs of electrical contacts actuatable by said registering carriage, one of said pairs of contacts being actuated when said registering carriage reaches said storing carriage and the other pair of said contacts being actuated when said registering carriage assumes a preselected position, said pairs of contacts controlling the stop/play and stop/rewind operation of the machine.

19. The apparatus of claim 1, wherein said operating means comprise keys and said control means comprise a rotary camshaft having cams for actuating said keys, motor means for driving said camshaft, and means for transmitting said control signals to said motor means.

20. The apparatus of claim 1, wherein said operating means comprise keys and said control means comprise a set of solenoids for actuating said keys and means for transmitting said control signals to said solenoids.

* * * * *